June 3, 1930.  N. B. CHACE  1,761,181
TOOL DISLODGING DEVICE
Filed Nov. 12, 1927  2 Sheets-Sheet 1

INVENTOR.
Norman B. Chace
BY
ATTORNEYS.

June 3, 1930.  N. B. CHACE  1,761,181
TOOL DISLODGING DEVICE
Filed Nov. 12, 1927  2 Sheets-Sheet 2
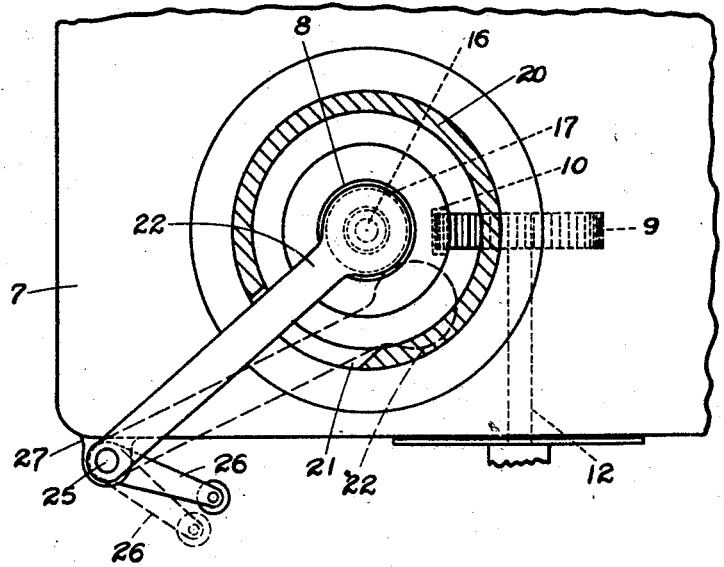
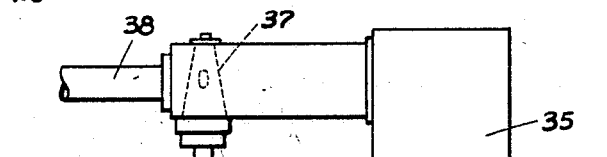
INVENTOR.
Norman B. Chace
BY
ATTORNEYS Patented June 3, 1930

1,761,181

UNITED STATES PATENT OFFICE

NORMAN B. CHACE, OF CINCINNATI, OHIO, ASSIGNOR TO THE FOSDICK MACHINE TOOL COMPANY OF CINCINNATI, OHIO, A CORPORATION OF OHIO

TOOL-DISLODGING DEVICE

Application filed November 12, 1927. Serial No. 232,909.

This invention relates to improved means for dislodging drills from the taper chuck of a drill spindle or the like.

An object of the invention is to provide means whereby a drill may be expediently dislodged from a taper chuck.

Another object is to provide a mechanism whereby the drill is dislodged from the chuck when the spindle is moved to the upper limit of the spindle traverse.

Another object is to provide means whereby the dislodging means may be rendered inoperative at the said upper limit of spindle traverse.

These and other objects are attained by the means described herein and disclosed in the accompanying drawing, in which:

Fig. 2 is a cross sectional view taken on line 2—2 of Fig. 1.

Fig. 4 is an elevational view, partly in section of a second modified form of the invention.

Figure 1:
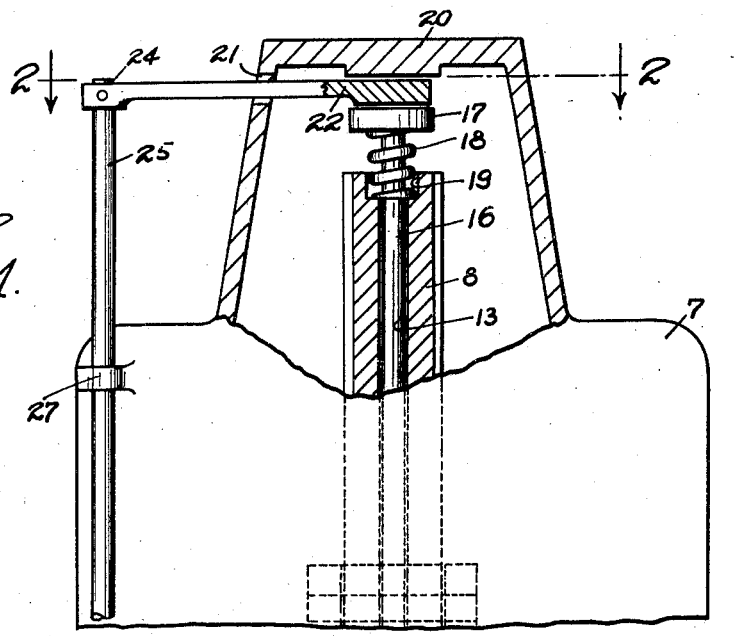
Fig. 1 is a front elevational view, partly in section, of a drill head having applied thereto the device of this invention.

The present invention, though herein described in connection with a drill head of a radial or other drill, is applicable to machines of various types in which a reciprocable member carries a tool or drill in a chuck comprising a tapered bore. Fig. 1 exemplifies a spindle support or drill head 7 upon which is reciprocally mounted a rotatable drill spindle 8. The spindle is adapted to be reciprocated by any suitable known means such as a pinion 9 engaging a rack 10 on the spindle. Pinion 9 may be rotated by means comprising a pair of handles 11 secured upon a shaft 12 carrying pinion 9.

Spindle 8 is provided with a longitudinal bore 13 communicating with a tapered bore or chuck 14 which frictionally holds a drill or other tool 15. A ram 16 provided with a suitable head 17 is reciprocally mounted in the bore 13 and is yieldingly held in spaced relation from drill 15 by means of a spring 18. Spring 18 is received in a counter-bore 19 in the spindle 8 to preclude injury to the spring when compressed as will be described later.

A stationary bumper or abutment 20 is provided on the head 7 directly above the ram 16. The bumper is preferably formed integral with the head 7. Through a perforation 21 in the bumper 20 extends a movable bumper 22 which may be interposed between the stationary bumper 20 and head 17 of the ram as shown in Fig. 2. The purpose of movable bumper 22 is to stop the upward movement of ram 16 when spindle 8 is being raised to its uppermost limit of travel, whereupon the spindle continues to move upwardly relative to the ram 16. Continued upward movement of the spindle and the drill 15 causes the end 23 of the ram to strike the end of drill 15, dislodging the drill from the tapered bore.

Movable bumper 22 is provided with a perforate hub 24 adapted for receiving an actuating means such as an oscillatable rod 25 provided with a suitable hand lever or crank 26, conveniently positioned adjacent the drill head. Suitable bearings 27 may be provided on the head for receiving rod 25. The purpose of the movable bumper and the actuating mechanism therefor is to permit selective interposition of the movable bumper as stated above. As shown by broken lines in Fig. 2, the movable bumper 22 may be disposed, by means of crank 26, out of alignment with ram head 17. The effect of thus moving the bumper 22 will be explained in the operation, which follows.

Assuming that the machine of Fig. 1 is to be used for drilling two identical holes, an operator positions the drill 15 over the work and begins the cut by actuating handles 11, which control the feed. Of course, the preferred feed means would be automatic, this forming no part of the present invention. After drilling the first hole, the operator actuates handles 11 thereby raising the spindle 8 and drill 15 from the work. The movable bumper 22 should then be in the position shown by broken lines in Fig. 2 to preclude contact of ram head 17 therewith. Though the spindle be then raised to its upper limit, which is governed by any known means such as by the length of rack 10, the head 17 will have no abutment and consequently will not be actuated to strike and dislodge the drill. It is to be understood that when the upper limit is reached, head 17 is spaced from stationary bumper 20 which therefore can not actuate ram 16. From the foregoing, it is apparent that drill 15 will remain in the chuck.

The operator then proceeds to drill the second hole, and in the same manner the drill is positioned over the work. After this second drilling operation, however, it is desired to remove the drill 15. The operator thereupon actuates lever or crank 26, throwing the movable bumper into the position shown by full lines in Fig. 2. Then upon completion of the second drilling, he actuates handles 11 to elevate the spindle to the upper limit of travel, whereupon the ram head 17 strikes bumper 22 and forces the ram relatively downwardly in the spindle bore, thereby striking the end of the drill and dislodging it from the chuck. The well known perforation 40 in the spindle may be retained, if desired, to permit use of a wedge for manually removing the drill.

Figure 3:
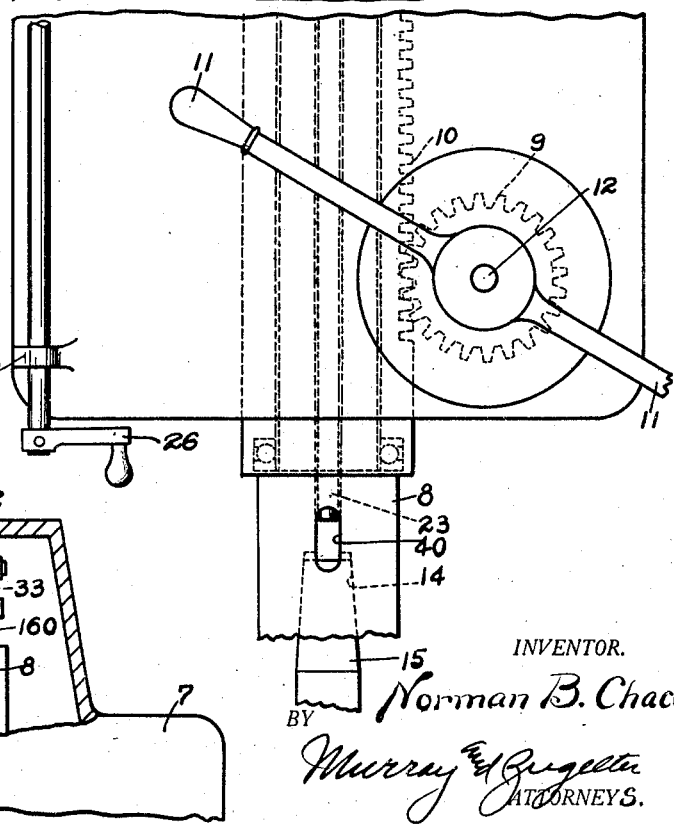
Fig. 3 is an elevational view, partly in section, of a modified form of the invention.

In Fig. 3 is shown an electrically operated means for imparting a rapid hammer-like action to the ram 160 which simulates ram 16 of Figs. 1 and 2. A motor 30 has a rotatable shaft 31, on one end 33 of which is fixedly secured an eccentric 32. When the spindle 8 is raised, the ram 160 is brought into contact with eccentric 32, which is actuated by the motor upon closing the electrical switch 34. A rapid reciprocating motion is thereby imparted to the ram, which strikes the end of drill 15 when the spindle is elevated to the upper limit.

The eccentric and motor of Fig. 3 may be replaced by an air hammer 35 having a suitable reciprocating plunger 36 for actuating ram 160 as shown in Fig. 4. The hammer 35 may be controlled by a suitable valve 37 connected with the air line 38. The valve is actuated by a rod 39 conveniently located on the head.

It is to be understood that various modifications may be made in the structural and mechanical details of the device without departing from the spirit of the invention.

What is claimed is:

1. In a device of the class described, the combination with a spindle support means, of a hollow spindle reciprocally mounted on the support means, a chuck at one end of the spindle adapted to receive and frictionally hold a tool in alignment with the bore of the spindle, a longitudinally ram reciprocable in the bore of the spindle and adapted for abutting the tool, and a movable abutting means disposed above the ram and adapted to be selectively moved into and out of alignment with the ram, whereby upward movement of the spindle may cause the ram to strike the movable abutting means and impart to the ram a relatively downward movement for striking and dislodging the tool from the chuck.

2. In a device of the class described the combination with a spindle support means provided with an abutting means, of a hollow spindle reciprocally mounted on the support means, means for reciprocating the spindle, a chuck adapted to receive and frictionally hold a drill in alignment with the bore of the spindle, a longitudinal ram reciprocable in the bore of the spindle, one end thereof being adapted for abutting the drill and normally spaced therefrom, the other end adapted for abutting the abutting means, whereby movement of the spindle may cause the ram to strike the abutting means and the drill for dislodging the drill from the chuck, and means whereby the ram may be precluded from abutment with the abutting means.

3. In a device of the class described the combination with a spindle support means, of a spindle reciprocally mounted on the support means, means for reciprocating the spindle, a chuck at one end of the spindle adapted to receive and frictionally hold a drill, means comprising a member reciprocable interiorly of the spindle and a movable abutment therefor for dislodging the drill from the chuck upon actuation of the reciprocating means, and means whereby the dislodging means may be rendered inoperative.

4. The combination of a reciprocable chuck member for receiving and holding a tool, means for dislodging the tool upon movement of the chuck member to a predetermined position, and manually movable means for rendering said dislodging means inoperative when the chuck member is moved to said predetermined position.

5. The combination of a reciprocable chuck member for receiving and holding a tool, means reciprocable with the chuck member for dislodging the tool upon movement of the chuck member to a predetermined position, and means movable into and out of the path of movement of the dislodging means, for rendering inoperative said dislodging means upon movement of the chuck member to said predetermined position.

6. The combination of a reciprocable chuck member for receiving and holding a tool, a ram reciprocable with the chuck member and adapted for abutting the tool, and an abutting means selectively movable to operative and inoperative positions relative to the ram whereby upward movement of the chuck member may cause the ram to strike the abutting means when in the operative position, for imparting to the ram a relatively downward movement for dislodging the tool from the chuck member.

7. In a device of the class described the combination of a hollow reciprocally mounted spindle means to frictionally hold a tool at one end of the spindle a longitudinal member disposed in the hollow spindle and capable of movement into abutment with the tool, means yieldingly retaining said member out of abutment with the tool and means movable into the path of said spindle and longitudinal member whereby movement of the spindle may overcome the yielding means to effect abutment between the longitudinal member and the tool for dislodging the tool.

In testimony whereof, I have hereunto subscribed my name this 10th day of November, 1927.

NORMAN B. CHACE.